United States Patent Office 3,331,034
Patented July 11, 1967

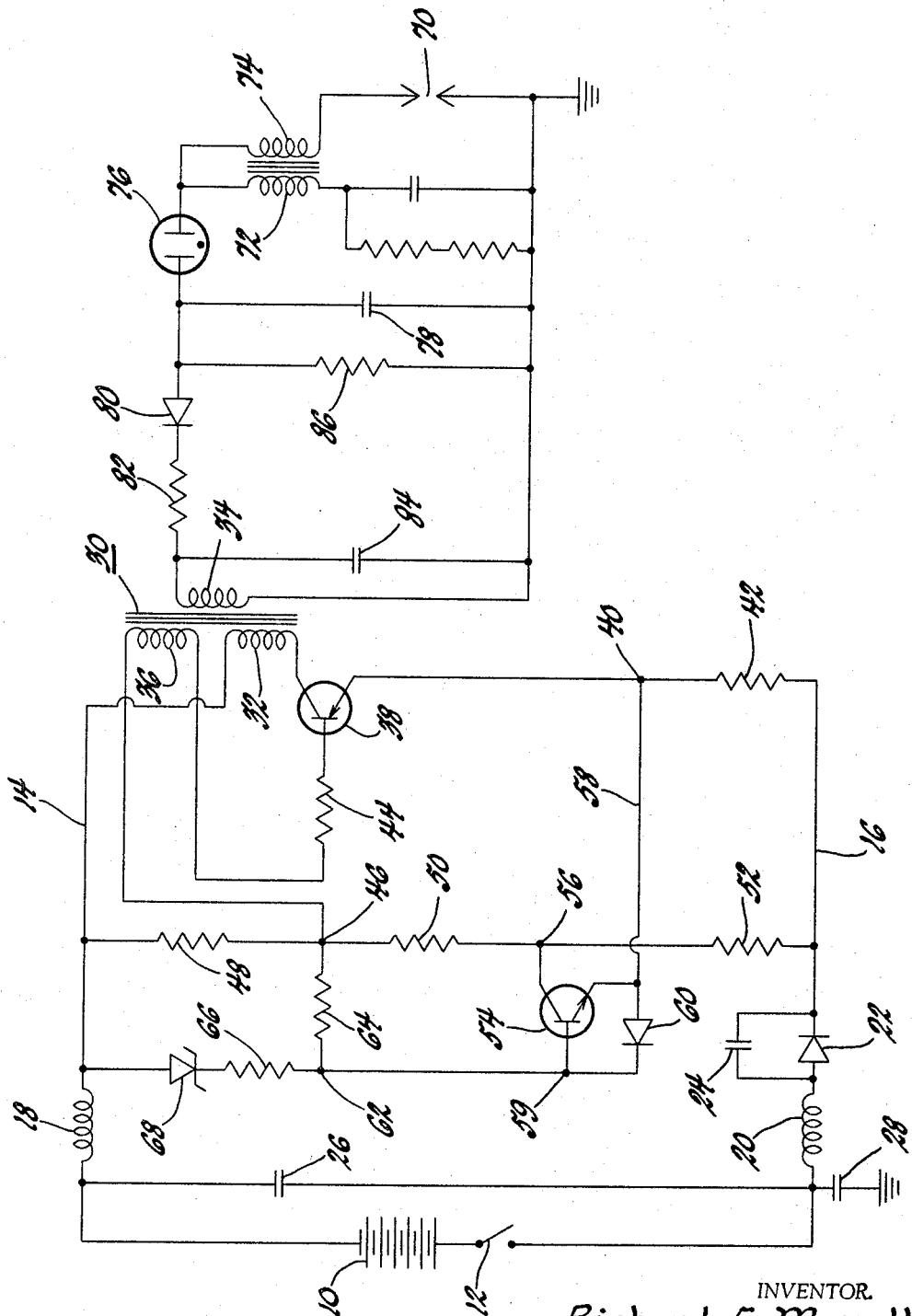

3,331,034
CONVERTER STABILIZING CIRCUIT
Richard E. Massoll, Flint, Mich., assignor to General Motors Corporation, Detroit, Mich., a corporation of Delaware
Filed Sept. 10, 1964, Ser. No. 395,510
1 Claim. (Cl. 331—113)

This invention relates to DC to DC converters and more particularly to a stabilizing circuit for a transistor DC to DC converter.

It is well known to provide a DC to DC converter which is of the relaxation oscillator type that includes a transistor and a transformer having a primary winding, a secondary winding and a tertiary winding. This type of system is described in an article entitled "Transistor Power Supplies" published in the December 1955 issue of "Wireless World."

This invention relates to the provision of a bias network for such a known type of oscillator which is capable of stabilizing the operation of the oscillator against input voltage variations by stabilizing the input current. It accordingly is one of the objects of this invention to provide a DC to DC converter of the relaxation oscillator transistor type which includes means for stabilizing the operation of the oscillator as the input voltage varies.

Another object of this invention is to provide a DC to DC converter which makes it possible to use a smaller and more efficient transformer design in regard to copper losses, core size, core gap and leakage inductance.

Another object of this invention is to provide an oscillator circuit which is capable of using a transistor of a smaller voltage rating.

Still a further object of this invention is to provide an oscillator circuit wherein the size and the weight of the heat sink for the power transistor may be reduced thus allowing a smaller and lighter package for the converter.

Still a further object of this invention is to provide a DC to DC converter where the power requirements of the components of the converter can be reduced by the use of the bias network of this invention.

A further object of this invention is to provide an ignition system which is powered by a stabilized transistor oscillator.

In carrying forward the above noted objects, the bias network is arranged to sense the input voltage to the converter and then varies the resistance of the base circuit of the power transistor to vary the output current of the converter in accordance with the amount of input voltage applied to the converter.

Further objects and advantages of the present invention will be apparent from the following description, reference being had to the accompanying drawings wherein a preferred embodiment of the present invention is clearly shown.

In the drawings:

The single figure drawing is a schematic circuit diagram of a DC to DC converter made in accordance with this invention and shown powering an ignition system.

The DC to DC converter of this invention will be described in connection with an ignition system but it will be appreciated by those skilled in the art that this converter could be used to energize other loads.

Referring now to the drawing, the reference numeral 10 designates a source of direct current which may be, for example, a 28 volt source. When the switch 12 is closed, the voltage of the source is impressed on power conductors 14 and 16 through the inductances 18 and 20 and through a diode 22. A capacitor 24 is connected in parallel with the diode 22 and another capacitor 26 is connected across the direct current source 10. Another capacitor 28 is connected between ground and the positive side of the direct current source. The voltage of the direct current source 10 will vary and the bias circuit of this invention compensates for such variations as will be described.

The DC to DC converter of this invention includes a transformer generally designated by reference numeral 30. This transformer has a primary winding 32, a secondary winding 34 and a tertiary winding 36 all wound on the same core.

The system has a PNP transistor 38. The collector of transistor 38 is connected to one side of the primary winding 32 while the emitter is connected with a junction 40. A resistor 42 is connected between junction 40 and the positive power line 16. The resistor 42 is optional and if it is used, it has a small resistance value of, for example, .3 ohm. The base of transistor 38 is connected to one side of the feedback or tertiary winding 36 of the transformer through a resistor 44. The opposite side of the winding 36 is connected with a junction 46.

A resistor 48 connects junction 46 and power lead 14 while the resistors 50 and 52 connect the junction 46 with power lead 16.

The bias circuit for the transistor DC to DC converter includes an NPN transistor 54. The collector of transistor 54 is connected with junction 56 which is between resistors 50 and 52. The emitter of transistor 54 is connected with junction 40 by a conductor 58. The base of transistor 54 is connected with junction 59. A diode 60 connects the emitter of transistor 54 and the junction 59. The junction 59 is connected with junction 62. A resistor 64 connects the junctions 46 and 62. The junction 62 is connected with the power lead 14 through a resistor 66 and a Zener diode 68.

The secondary winding 34 is used to power an ignition system which includes a spark gap 70 and an ignition transformer having a primary winding 72 and a secondary winding 74. This ignition system includes a tube 76 having a predetermined breakdown voltage. The primary 72 is connected in series with a resistor-capacitor combination as shown. A capacitor 78 is provided which can be charged from winding 34 through a circuit that includes diode 80 and resistor 82. A capacitor 84 is connected across the secondary 34 while a resistor 86 is connected in parallel with the capacitor 78.

The ignition system which is powered by the output current of secondary winding 34 is known to those skilled in the art and therefore is not described in detail. It will be sufficient to state that capacitor 78 is charged through diode 80 by the pulsating current developed in the secondary winding 34 when the converter is oscillating. When the charge on the capacitor 78 is sufficient to break down the tube 76, the capacitor will discharge through the primary winding 72 and cause a firing of the spark gap 70. The spark gap 70 is continuously fired as long as the switch 12 is closed and can be used to ignite the combustible mixture of turbine engine.

The operation of the DC to DC converter of this invention will now be described with particular attention to the bias circuit for stabilizing the output of the converter. It will, of course, be appreciated by those skilled in the art that the system operates in such a manner that the transistor 38 is switched on and off to control current flow through primary winding 32 with a result that a pulsating current is developed in the secondary winding 34.

When the transistor 38 is turned on, a ramp function of current flows in the primary winding 32 of the transformer 30 storing energy in the magnetic field of the transformer. The peak value of current is determined by the gain of transistor 38, by the turns ratio of windings 36 and 32, by the input voltage and by the resistance in series between the winding 36 and the emitter of transistor 38. It can be shown that as the input voltage appearing between conductors 14 and 16 is increased, the peak value of input current will also increase, and that as the resistance from one end of winding 36 to the emitter of transistor 38 is increased, the peak current developed by the converter will decrease.

When the input voltage appearing across conductors 14 and 16 is less than the breakdown voltage of Zener diode 68 and during the time that transistor 38 is turned on, current flows from the base of transistor 38 through the winding 36 and current also flows through the biasing network comprised of resistors 44, 50 and 52 to the emitter of transistor 38 through resistor 42. The current flow through resistors 50 and 52 provides a voltage drop across resistors 50 and 52 of the proper polarity for forward biasing transistor 54. The base of transistor 54 is connected through resistor 64 to the junction 46 and the junction 46 is positive with respect to both the collector and emitter of transistor 54. With transistor 54 forward biased, it will conduct current shunting resistor 52 to reduce the resistance in the base circuit of transistor 38 allowing greater base current to flow which, in turn, increases the collector peak current and the transformer primary current. This will increase the input power and output power of the oscillator to a greater value than if transistor 54 were not conducting.

As the input voltage appearing between conductors 14 and 16 increases, the input current will also increase until the breakdown voltage of the Zener diode 68 is attained. When the Zener diode 68 breaks down, current flows through resistor 66 and diode 60. The voltage drop across diode 60 will cause the base of transistor 54 to become more negative than the emitter to therefore turn off the transistor 54 in its collector-emitter circuit and therefore cause the base current for transistor 38 to flow through resistor 52. This will decrease the base current of transistor 38 because of the added resistance in its base circuit. The decrease in base current will reduce the collector current of transistor 38 and the input current to the converter.

The resistors 50 and 44 are used in the circuit to set the base drive for transistor 38 during low input voltage operation when transistor 54 is conducting. The resistor 50 allows the base of transistor 54 to be forward biased by a greater voltage than if resistor 50 were removed and the base was connected to the collector of transistor 54 through resistor 64. This will allow a transistor with less gain to be used for transistor 54. In addition, less power will be dissipated in the transistor when operated at or near saturation. The resistor 50, however, is optional and may be omitted from the circuit if desired.

The resistor 66 limits the current in Zener diode 68 and diode 60 when the Zener diode 68 breaks down and conducts current. The diode 60 clamps the junction 62 to a low negative voltage when Zener diode 68 is conducting, thus preventing transistor 38 from being forward biased through winding 36. The diode 60 also limits the reverse bias on transistor 54 to a safe value.

The resistor 42 is used to furnish negative feedback to transistor 38 during high voltage input. This resistor also increases the bias to transistor 38 under low voltage operation. This resistor is optional and may be omitted if conditions permit. The Zener voltage of Zener diode 68 or its breakdown voltage determines the input voltage at which the transistor 54 is caused to shut off.

When large input voltage variations are applied to a DC to DC converter of the type described, the bias circuit of this invention with its more constant input current characteristic makes it possible to use a smaller and more efficient transformer design in regard to leakage inductance, core size, core gap and copper losses. The leakage inductance is the cause of voltage spikes which appear across transistor 38 when it is switched off. If sufficient current is allowed to flow in the primary 32, the transformer core will be saturated causing high leakage inductance and, therefore, increased voltage spikes. The voltage spikes will reduce the reliability of transistor 38 and requires a transistor of higher voltage rating which increases the cost of the converter. By maintaining a more constant current for the converter, the power requirement of transistor 38 is further reduced because of the lower peak current and lower peak dissipation. The size and weight of the heat sink for the transistor may also be reduced thus allowing a smaller and lighter package for the converter. In addition with the bias network of this invention, the power requirements of all the components in the converter are reduced.

While the embodiment of the present invention as herein disclosed constitutes a preferred form, it is to be understood that other forms might be adopted.

What is claimed is as follows:

A transistor oscillator comprising, first and second conductors adapted to be connected with a source of direct current, a transformer having a primary winding, a secondary winding and a tertiary winding, an electrical load connected with said secondary winding, a first transistor having emitter, collector and base electrodes, means connecting the emitter and collector electrodes of said first transistor and said primary winding in series across said first and second conductors, a voltage dividing network connected across said first and second conductors having a junction, means connecting said tertiary winding between the base electrode of said first transistor and said junction, a second junction on said voltage divider network, a second transistor having emitter, collector and base electrodes, means connecting the emitter and collector electrodes of said second transistor in series between said second junction on said voltage divider and the emitter of said first transistor, a Zener diode, and means connecting said base electrode of said second transistor with said first junction on said voltage divider, said base electrode of said second transistor being connected to one of said first and second conductors through said Zener diode.

References Cited

UNITED STATES PATENTS

| | | | |
|---|---|---|---|
| 2,905,835 | 9/1959 | Wray | 307—88.5 |
| 3,019,782 | 2/1962 | Kuritza | 307—88.5 |
| 3,033,996 | 5/1962 | Atherton | 331—112 |
| 3,069,612 | 12/1962 | Hamilton | 331—111 |
| 3,191,093 | 6/1965 | Morrison et al. | 315—209 |
| 3,234,452 | 2/1966 | Ganszky | 321—18 |

JOHN W. HUCKERT, *Primary Examiner.*

J. D. CRAIG, *Assistant Examiner.*